(12) United States Patent
Oakley et al.

(10) Patent No.: US 9,880,693 B2
(45) Date of Patent: *Jan. 30, 2018

(54) EXAMPLE BASED VIDEO EDITING

(71) Applicant: Microsoft Technology Licensing, LLC, Redmond, WA (US)

(72) Inventors: Randolph Bruce Oakley, Bellevue, WA (US); Michael J. Patten, Sammamish, WA (US); Andrew Kutruff, Seattle, WA (US); Russell Scott Randall, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 772 days.

This patent is subject to a terminal disclaimer.

(21) Appl. No.: 13/743,390

(22) Filed: Jan. 17, 2013

(65) Prior Publication Data

US 2013/0132844 A1    May 23, 2013

Related U.S. Application Data

(63) Continuation of application No. 11/560,959, filed on Nov. 17, 2006, now Pat. No. 8,375,302.

(51) Int. Cl.
*G06F 17/30* (2006.01)
*G06F 3/048* (2013.01)
(Continued)

(52) U.S. Cl.
CPC ............ *G06F 3/048* (2013.01); *G06F 9/4443* (2013.01); *G06F 17/30056* (2013.01);
(Continued)

(58) Field of Classification Search
CPC . G06F 17/24; G06F 17/30056; G11B 27/036; H04N 21/854
(Continued)

(56) References Cited

U.S. PATENT DOCUMENTS 5,467,288 A * 11/1995 Fasciano ................. G06T 17/00
715/202
5,604,857 A * 2/1997 Walmsley ............ G11B 27/034
345/473
(Continued)

FOREIGN PATENT DOCUMENTS

JP    05-290548       11/1993
JP    5604857 B2 *   10/2014

OTHER PUBLICATIONS

Adams, et al., "Weaving Stories in Digital Media: When Spielberg Makes Home Movies," MM'03, Nov. 2-8, 2003, pp. 207-210, ACM Publishing, USA.
(Continued)

*Primary Examiner* — Matthew Ell
*Assistant Examiner* — Nhat-Huy T Nguyen
(74) *Attorney, Agent, or Firm* — Workman Nydegger (57) ABSTRACT

Enabling creation of a user-specific storyboard style based on a storyboard edited by a user. Metadata defined by analyzing the editing decisions made by the user and the media content associated with the storyboard represents the user-specific style. The user-specific style may be applied to other media content to produce a fully edited storyboard that matches the style of the example storyboard from which the user-specific style was created. The produced storyboard is combined with the other media content to produce audio/video data for consumption by the user.

20 Claims, 5 Drawing Sheets

(51) Int. Cl.

| | | |
|---|---|---|
| G11B 27/036 | (2006.01) | |
| G06F 9/44 | (2006.01) | |
| G11B 27/034 | (2006.01) | |
| G11B 27/34 | (2006.01) | |
| H04N 21/854 | (2011.01) | |

(52) U.S. Cl.
CPC .......... *G11B 27/034* (2013.01); *G11B 27/036* (2013.01); *G11B 27/34* (2013.01); *H04N 21/854* (2013.01)

(58) Field of Classification Search
USPC ........................................ 715/202, 723, 732
See application file for complete search history.

(56) References Cited

U.S. PATENT DOCUMENTS

| | | | | |
|---|---|---|---|---|
| 5,659,792 | A * | 8/1997 | Walmsley | G06F 17/30017 348/E5.022 |
| 6,016,380 | A | 1/2000 | Norton | |
| 6,085,020 | A * | 7/2000 | Saito | G11B 27/034 386/281 |
| 6,137,483 | A | 10/2000 | Kiyono et al. | |
| 6,424,789 | B1 | 7/2002 | Abdel-Mottaleb | |
| 6,697,061 | B1 * | 2/2004 | Wee | H04N 19/61 345/419 |
| 6,721,361 | B1 | 4/2004 | Covell et al. | |
| 6,882,793 | B1 * | 4/2005 | Fu | G06F 17/30802 385/125 |
| 6,928,613 | B1 | 8/2005 | Ishii et al. | |
| 6,954,894 | B1 | 10/2005 | Balnaves et al. | |
| 6,970,639 | B1 | 11/2005 | McGrath et al. | |
| 7,013,432 | B2 | 3/2006 | Taylor et al. | |
| 7,062,532 | B1 | 6/2006 | Sweat et al. | |
| 7,124,366 | B2 * | 10/2006 | Foreman | G06F 3/0483 375/E7.026 |
| 7,352,952 | B2 * | 4/2008 | Herberger | G11B 27/031 715/723 |
| 7,614,012 | B1 | 11/2009 | Dulaney | |
| 7,643,723 | B2 | 1/2010 | Ishii | |
| 7,668,438 | B2 | 2/2010 | Fu et al. | |
| 7,683,940 | B2 * | 3/2010 | Fleming | G11B 27/034 348/207.1 |
| 7,739,599 | B2 | 6/2010 | Patten et al. | |
| 7,822,643 | B2 | 10/2010 | Negley | |
| 7,861,169 | B2 * | 12/2010 | Hull | G06F 3/1204 358/1.15 |
| 8,180,826 | B2 * | 5/2012 | Hua | G06F 17/30793 709/201 |
| 8,204,750 | B2 | 6/2012 | DeWitt | |
| 8,375,302 | B2 * | 2/2013 | Oakley | G06F 9/4443 715/202 |
| 8,893,015 | B2 * | 11/2014 | Lanahan | G06F 17/241 715/730 |
| 2001/0040592 | A1 * | 11/2001 | Foreman | G06F 3/0483 715/723 |
| 2001/0041020 | A1 | 11/2001 | Shaffer et al. | |
| 2002/0122067 | A1 | 9/2002 | Geigel et al. | |
| 2002/0136294 | A1 * | 9/2002 | Culbert | H04N 19/61 375/240.02 |
| 2002/0154695 | A1 * | 10/2002 | Cornog | H04N 5/145 375/240.16 |
| 2002/0175917 | A1 * | 11/2002 | Chakravarty | G11B 27/034 345/473 |
| 2003/0001846 | A1 | 1/2003 | Davis et al. | |
| 2003/0052909 | A1 * | 3/2003 | Mo | G11B 27/034 715/716 |
| 2003/0052910 | A1 | 3/2003 | Shiiyama | |
| 2003/0122873 | A1 * | 7/2003 | Dieberger | G06F 17/30696 715/764 |
| 2003/0210886 | A1 * | 11/2003 | Li | G06F 17/30793 386/241 |
| 2003/0215214 | A1 | 11/2003 | Ma | |
| 2003/0222899 | A1 | 12/2003 | Alvesalo | |
| 2003/0234805 | A1 * | 12/2003 | Toyama | G06F 3/0481 715/723 |
| 2004/0001106 | A1 | 1/2004 | Deutscher et al. | |
| 2004/0004665 | A1 | 1/2004 | Kashiwa | |
| 2004/0085341 | A1 * | 5/2004 | Hua | G11B 27/28 715/723 |
| 2004/0128308 | A1 | 7/2004 | Obrador | |
| 2004/0223747 | A1 | 11/2004 | Otala et al. | |
| 2005/0053356 | A1 | 3/2005 | Mate et al. | |
| 2005/0249080 | A1 | 11/2005 | Foote et al. | |
| 2005/0273470 | A1 | 12/2005 | Heigold | |
| 2005/0281535 | A1 | 12/2005 | Fu et al. | |
| 2006/0026529 | A1 | 2/2006 | Paulsen et al. | |
| 2006/0284978 | A1 | 12/2006 | Girgensohn et al. | |
| 2007/0009231 | A1 | 1/2007 | Shinkai et al. | |
| 2007/0074115 | A1 * | 3/2007 | Patten | G11B 27/032 715/716 |
| 2007/0168543 | A1 | 7/2007 | Krikorian et al. | |
| 2007/0218448 | A1 * | 9/2007 | Harmeyer | G09B 5/00 434/350 |
| 2007/0230807 | A1 | 10/2007 | Shiiyama | |
| 2008/0120550 | A1 * | 5/2008 | Oakley | G06F 9/4443 715/723 |
| 2008/0180535 | A1 * | 7/2008 | Habuka | G06T 7/20 348/208.4 |
| 2008/0256432 | A1 * | 10/2008 | Sambandam | G06Q 10/00 715/212 |
| 2009/0012433 | A1 * | 1/2009 | Fernstrom | A61B 5/1112 600/593 |
| 2009/0013252 | A1 * | 1/2009 | DeWitt | H04N 21/854 715/716 |
| 2010/0005379 | A1 | 1/2010 | Lanahan et al. | |
| 2010/0115410 | A1 * | 5/2010 | Fu | G06F 17/30802 715/721 |
| 2011/0268426 | A1 * | 11/2011 | Kikuchi | G11B 27/034 386/278 |
| 2012/0042251 | A1 * | 2/2012 | Rodriguez | G11B 27/034 715/723 |

OTHER PUBLICATIONS

Davis, "Active Capture: Automatic Direction for Automatic Movies," MM'03, Nov. 2-8, 2003, pp. 602-603, ACM Publishing, USA.

Hua et al., "LazyCut—Content-Aware Template-Based Video Authoring," MM'05, Nov. 6-11, 2005, 2 pages, ACM Publishing, Singapore.

O'Brien-Strain et al., "Using Film-Making Techniques to Synthesize Compelling Video Shows from Consumer Photographs," Hewlett-Packard Development Company, LP, 2005, 4 pages, USA.

* cited by examiner

FIG. 5

EXAMPLE BASED VIDEO EDITING

This present application is a continuation of U.S. application Ser. No. 11/560,959, filed Nov. 17, 2006.

BACKGROUND

Creating professional-looking home movies is a difficult task. Existing video editing systems are capable of creating aesthetically pleasing, professional-looking videos. These systems, however, are either too complex and difficult for users to easily learn and use in a time efficient manner, or too automated. With some existing systems, users are required to manually assemble a variety of different elements including video clips, audio clips, titles, effects, narration and background music. Combining these elements into a professional-looking home movie requires advanced skills and a significant time investment.

In addition, editing techniques vary from user to user. For example, a user who records a child's soccer game wants to create a highlight video that is brief and only focuses on key events such as defensive plays and goals. In this scenario, the user chooses video clips that are of high quality, contain a key event, and are focused on a particular child. The user may delete ground shot scenes, blurry scenes, and out of focus scenes. Since the video is a highlights video, the user shortens most of the video clips.

Another user, however, may edit a video of the same soccer game by creating a home movie that represents the entire game. In this case, the user only removes portions of video clips that are extremely poor in quality (e.g., very dark shots, shots of the ground, or blurry shots). The user in this scenario performs very little editing since the focus is to capture the entire event. Key events may be highlighted by applying a video effect to the video clip where a player makes a goal.

Each of the above users may make similar decisions when editing other videos. For example, the users are likely to use the same style when editing subsequent videos of soccer games. Unfortunately, the users must repeat the entire video editing process even though the same style and technique will be used again. Such repetition is time consuming, burdensome, and discouraging.

Other existing systems are completely automated. Features of such existing systems allow the user to automatically create a complete movie with little or no user interaction. Such existing systems have predefined styles, but these styles are limited and often do not meet the needs of the individual user. For example, users may have different goals and objects when creating a home movie. The built-in templates and predefined styles in existing systems confine the user to a particular style and do not provide the level of customization and flexibility needed to enable the user to create a professional-looking video that focuses on user-specific portions of interest.

Some existing video editing systems allow the user to replace sections of a video timeline or storyboard with different video clips. For example, stock footage, effects, and transitions may be preserved from one project to another, but the user must still manually choose what clips to include and edit the chosen clips. This approach results in videos that are very rigid and uniform.

SUMMARY

Embodiments enable creation of a user-specific storyboard style from analysis of a storyboard edited by a user. In an embodiment, editing decisions from the user are analyzed along with media content associated with the storyboard to define metadata representing the user-specific style. The user-specific style is applied to other media content to produce another storyboard according to the user-specific style. The other storyboard is combined with the other media content to produce audio/video data for consumption by the user.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
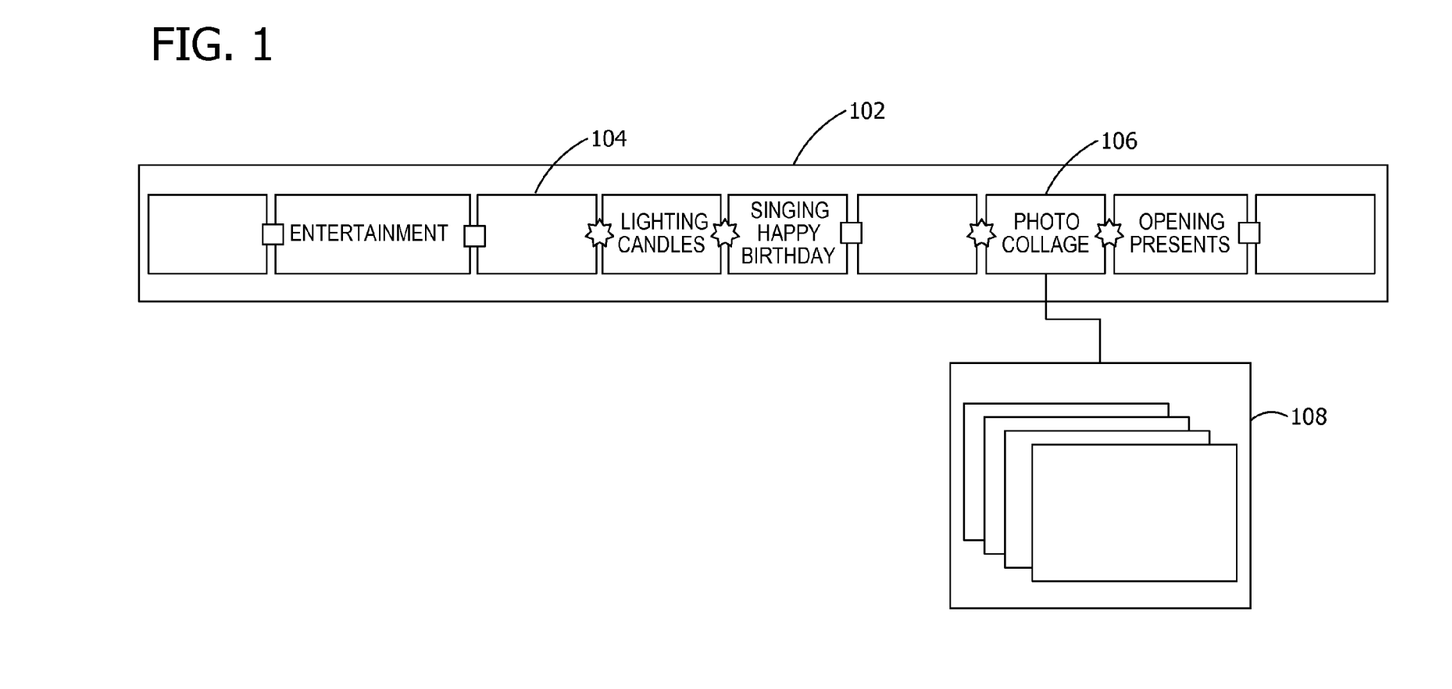
FIG. 1 is an exemplary block diagram illustrating a storyboard template having a plurality of cells therein.

Referring now to the drawings, an embodiment creates, based on user input, a storyboard or other timeline with input media content such as audio, video, still images, titles, credits, transitions, and effects to produce a desired output video. For example, the storyboard represents a linear collection of media content items arranged into cells according to a timeline. In particular, embodiments provide a storyboard 102 such as shown in FIG. 1 to a user for insertion of media content items selected by the user. The user interacts with the storyboard to associate selected media content items with the cells. For example, the user may rearrange the media content items on the storyboard. The storyboard 102 in FIG. 1 represents a well-structured arrangement of cells such as cell 104 to assist the user in creating the storyboard. The cells represent placeholders for the media content items. In an embodiment, each of the cells represents a collection of media content items that are grouped and have the same set of pre-defined properties. The properties, for example, describe the media content that may be associated with each of the cells. The resulting storyboard may be displayed to the user or written to a computer-readable medium.

After the user creates the original, initial, or example storyboard, this storyboard may be used as an example to create other storyboards. For example, aspects record editing decisions during creation of the example storyboard, or derive them from the example storyboard (e.g., by comparing the input media content with the output video). The editing decisions collectively comprise a user-specific style that may be applied to other input media content. For example, an embodiment analyzes the media content on the example storyboard to generate metadata. The user-specific style includes the generated metadata representing rules, properties, characteristics, constraints, restrictions, or the like that are applied to media content to create storyboards having consistent and aesthetically pleasing qualities. In this manner, storyboards created based on the application of a particular user-specific style reflect the same editing techniques used to produce the example storyboard (e.g., on which the user-specific style is based).

Aspects combine the ease of use of an automatic editing system with the ability to specify the style and technique used to implement example-based video editing. Unlike video templates that are rigid and time consuming to use, the user-specific style in aspects automatically creates an edited storyboard using the content media specified. The user-specific style enables the user to create aesthetically pleasing and professional-looking videos with little or no editing. This approach greatly improves the flexibility to the novice or professional user.

In one embodiment, the user creates a plurality of user-specific styles that may be saved, re-used, and shared with other users. This enables the professional user to transfer video expertise to novice consumers or other users. Professionally created user-specific styles enable consumers to create professional-looking, high-quality videos. The user-specific styles may also be nested.

Referring further to FIG. 1, the storyboard 102 includes a cell 106 representing a nested set of elements 108 in the illustrated embodiment. The elements 108 correspond to other storyboards, a collection of media content items, or the like. For example, the cell 106 allows the user to add multiple photos to the storyboard cell 106. The cell properties associated with cell 106 determine how the nested elements 108 will be rendered in the output video.

Figure 2:
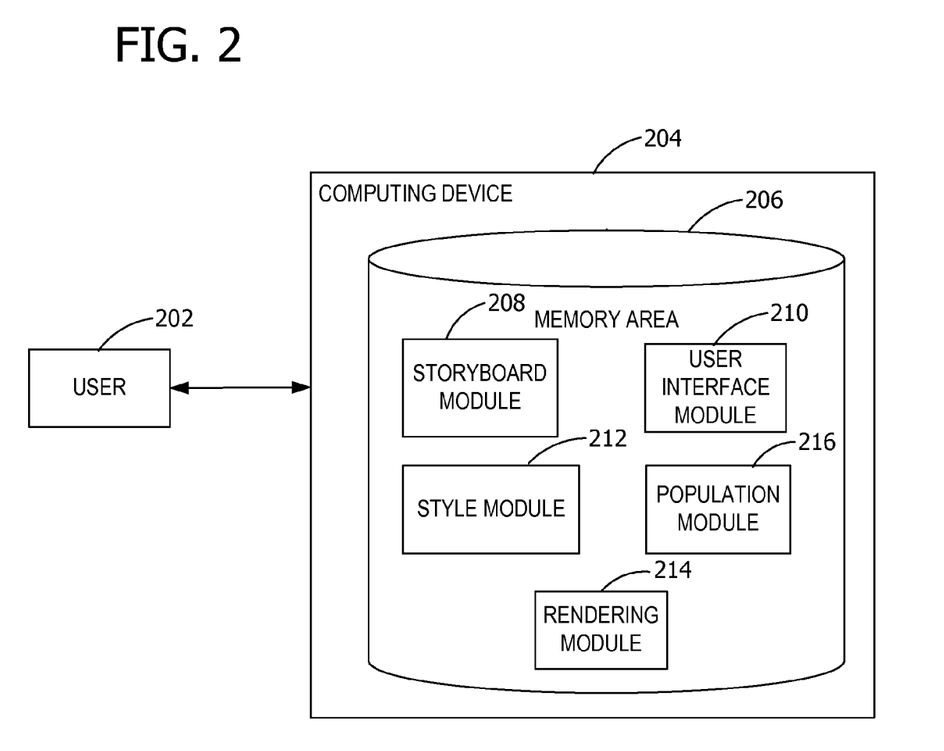
FIG. 2 is an exemplary block diagram illustrating a user interacting with a computing device to create a storyboard.

Referring next to FIG. 2, an exemplary block diagram illustrates a user 202 interacting with a computing device 204 to create a storyboard. The computing device 204 has access to a memory area 206 such as a computer-readable medium. While shown in FIG. 2 as being part of the computing device 204, the memory area 206 may also be located separately or remotely from the computing device 204. Computer readable media, which include both volatile and nonvolatile media, removable and non-removable media, may be any available medium that may be accessed by the computing device 204. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In accordance with an embodiment, the memory area 206 represents one or more computer-readable media having computer-executable components for implementing aspects. In FIG. 2, the components include a storyboard module 208, a user interface module 210, a style module 212, a population module 216, and a rendering module 214. The storyboard module 208 defines a first storyboard having a first plurality of cells each for association with one or more of a first set of media content items. The user interface module 210 receives the first set of media content items from a user for association with the first plurality of cells in the first storyboard. The user interface module 210 further receives editing decisions from the user for application to the first storyboard. The style module 212 analyzes the editing decisions and the first storyboard to define metadata representing a user-specific style associated with the first storyboard. The metadata includes a set of rules and logic for sequencing a storyboard. The style module 212 is responsible for analyzing the first storyboard to create the user-specific style. The metadata defines one or more cell properties describing the first plurality of cells in the first storyboard. The metadata further defines storyboard properties describing characteristics of the first storyboard.

The population module 216 applies the user-specific style to a second set of media content items provided by the user to populate a second plurality of cells in a second storyboard with the second set of media content items. The population module 216 converts the second set of media content items selected by the user to a new storyboard (e.g., the second storyboard) based on the user-specific style selected. The populated second plurality of cells conforms to the cell properties defined by the metadata associated with the user-specific style. The rendering module 214 combines the second storyboard from the population module 216 with the second set of media content items to produce audio/video data. The produced audio/video data may be displayed to the user 202 (e.g., via the user interface module 210) or written to a computer-readable medium (e.g., as a file).

Embodiments may be described in the general context of computer-executable instructions, such as program modules or components, executed by one or more computers or other devices. Generally, program modules or components include, but are not limited to, routines, programs, objects, components, and data structures that perform particular tasks or implement particular abstract data types. Aspects may be implemented with any number and organization of such components or modules. For example, aspects are not limited to the specific computer-executable instructions or the specific components or modules illustrated in the figures and described herein. Other embodiments may include different computer-executable instructions or components having more or less functionality than illustrated and described herein. Aspects may also be practiced in distributed computing environments where tasks are performed by remote processing devices that are linked through a communications network. In a distributed computing environment, program modules may be located in both local and remote computer storage media including memory storage devices.

Figure 3:
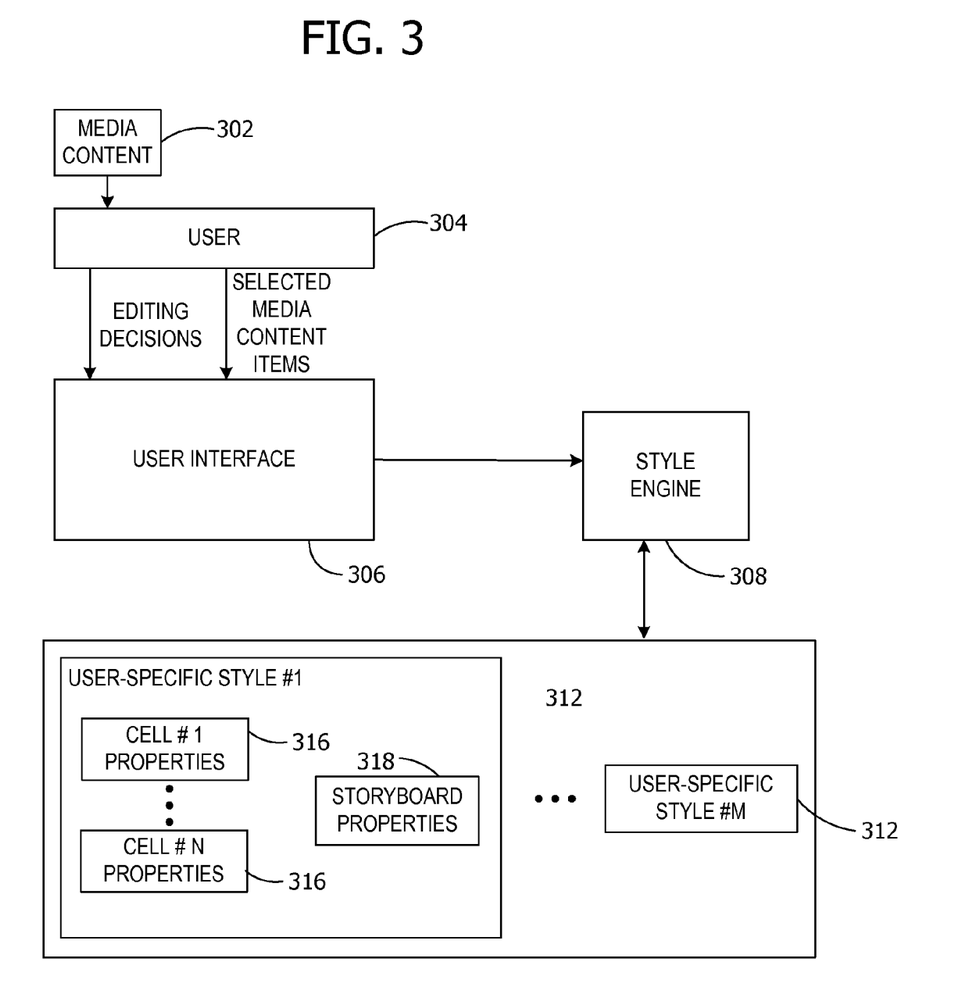
FIG. 3 is an exemplary block diagram illustrating components of an aspect for creating a user-specific style from an example storyboard.

Referring next to FIG. 3, an exemplary block diagram illustrates components of an aspect for creating a user-specific style 312 from input media content 302 and associated editing decisions. A user 304 interacts with a user interface 306 to create an example storyboard (e.g., storyboard 102) from a plurality of media content items. For example, the user 304 provides media content for inclusion in the example storyboard. The user 304 makes editing decisions regarding the example storyboard. The user edits the media content on the storyboard and performs editing tasks such as trimming a video clip, setting the duration of display of a photograph, adding a title or credit, adding a video fade transition between two storyboard cells, or applying a video effect to a video clip. For example, if creating a highlights video for a school soccer game, the user creates short video clips by trimming longer video clips and focusing on key events such as goals in the soccer game. The user trims or deletes long sections of slow moving or non-action portions. The soccer video may include a title and clips of each goal.

The example storyboard may be created by the user 304 from scratch, or from a predefined or default style. Exemplary predefined or default styles include birthdays, weddings, graduations, and vacations. Alternatively or in addition, the user 304 may select an event type, an occasion, or a theme from which to begin creation of the example storyboard. The user 304 is able to rearrange, add, and delete cells in the example storyboard.

A style engine 308 analyzes the editing decisions and the example storyboard to define metadata representing the user-specific style 312. The user-specific style 312 may be one of a plurality of user-specific styles 312 such as user-specific style #1 through user-specific style #M. The metadata defines at least one cell property 316 for each of the cells in the storyboard such as cell #1 properties through cell #M properties. The cell properties 316, for example, determine what media content items may be added to each cell and how the cell is rendered. Some cells may have no cell properties 312 or restrictions associated with them. Exemplary cell properties 312 are listed in Appendix A. The metadata further defines storyboard properties 318 associated with the example storyboard overall (e.g., overall characteristics of the example storyboard) rather than each individual cell. The storyboard properties 318 may also restrict what media content items may be added to particular cells or where a particular cell may be positioned within the storyboard (e.g., ordering). Exemplary storyboard properties 318 are listed in Appendix B.

In an embodiment, the style engine 308 includes computer-executable instructions for analyzing the media content added to the storyboard, the storyboard itself, and each cell within the storyboard to determine what rules and logic the user applied to each cell while editing the storyboard. The style engine 308 has a set of expandable rules and logic used to analyze and determine the style and technique the user performed when editing the example storyboard. The rules and logic represent techniques, known and unknown, for analyzing audio and video.

For example, the style engine 308 analyzes color histogram data for the media content of each cell and compares it to the corresponding unedited cell to determine the darkness and lightness of the input video clips. Another characteristic for analysis by the style engine 308 includes motion vectors. In this instance, style engine 308 determines how clips with various motion vector patterns are used based on the data from each cell. For example, the user creates a highlights video focusing on fast moving video while removing video clips with low motion vector values. The style engine 308 may also determine how much of the media content was excluded (e.g., trimmed) from the final storyboard. The analysts of various characteristics such as color histogram and motion vector helps determine a set of rules and logic for use by the style engine 308.

While the cell properties 316 and/or storyboard properties 318 are fixed in one embodiment, third-party developers or other users may alternatively write custom cell properties 316 or custom storyboard properties 318 in other embodiments. A customized cell property 312 includes, for example, a video filter that performs a customized function. For example, if the user 304 develops a face detection filter that automatically detects faces within a video clip, the user 304 may expose a custom face weighting property that determines the priority of video faces within the video clip.

In an embodiment, the user-specific style is stored as an extensible markup language (XML) file that stores the metadata representing the cell properties 316 and the storyboard properties 318. Appendix C lists exemplary XML code embodying exemplary metadata.

Figure 4:
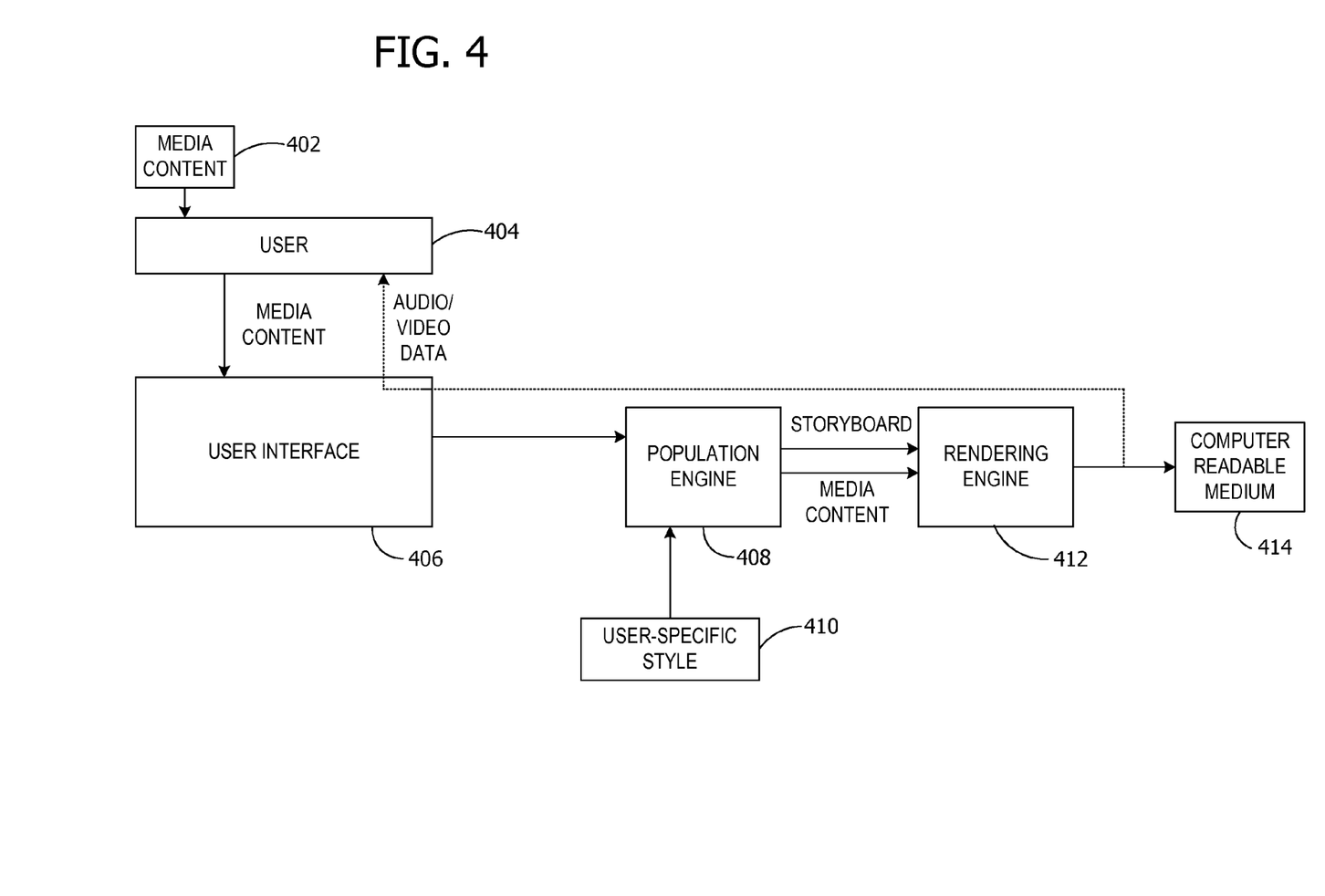
FIG. 4 is an exemplary block diagram illustrating components of an aspect for applying a user-specific style to input media content items.

Referring next to FIG. 4, an exemplary block diagram illustrates components of an aspect for applying a user-specific style to input media content items. A user 404 interacts with a user interface 406 to provide media content 402. A population engine 408 applies the user-specific style 410 (e.g., either a default style, or user-selected style) to the media content 402 to create a storyboard having a plurality of cells. The plurality of cells conforms to the cell properties (e.g., cell properties 316 in FIG. 3) defined by metadata associated with the user-specific style 410. For example, the population engine 408 applies the set of rules and logic derived from the editing of a first soccer video to a second soccer video. In an embodiment, audio elements (e.g., signature) of a portion of the input media content items are compared with audio elements of a portion of the audio elements from the example storyboard from which the user-specific style 410 was created. This facilitates accurate matching between the example project and the subject video.

In an embodiment, the population engine 408 processes the media content 402 enforcing the rules and logic associated with the user-specific style 410 (e.g., cell properties 316 and storyboard properties 318 in FIG. 3). The population engine 408 outputs a populated storyboard that properly sequences and edits the media content 402. The populated storyboard includes media content that has been edited using the same style and techniques the user applied to the example storyboard as described in FIG. 3. The automatic editing of the media content 402 may include, but is not limited to, trimming the video clips, setting the duration of photographs, removing content below a specified quality level, adding transitions between media content items such as a fade or dissolve, adding a graphic title or credit, applying video and photo effects such as color correction.

The rendering engine 412 includes computer-executable instructions for combining the created storyboard, pipeline, timeline, or the like, with the corresponding portions of the media content 412 to produce output audio/video data. The audio/video data may be recorded onto a computer-readable medium 414 such as in a file or on a hard disk, or optionally rendered directly to the user 404 via the user interface 406. In an embodiment, the rendering engine 412 obtains the selected media content items from the user 404 directly, from a memory area storing the selected media content items received from the user 404, or from the population engine 408. Empty cells in the storyboard are ignored by the rendering engine 412. The rendering engine 412 may provide feedback to the user interface 406, thus enabling the user 404 to better understand how the video will be rendered (e.g., a preview).

Figure 5:
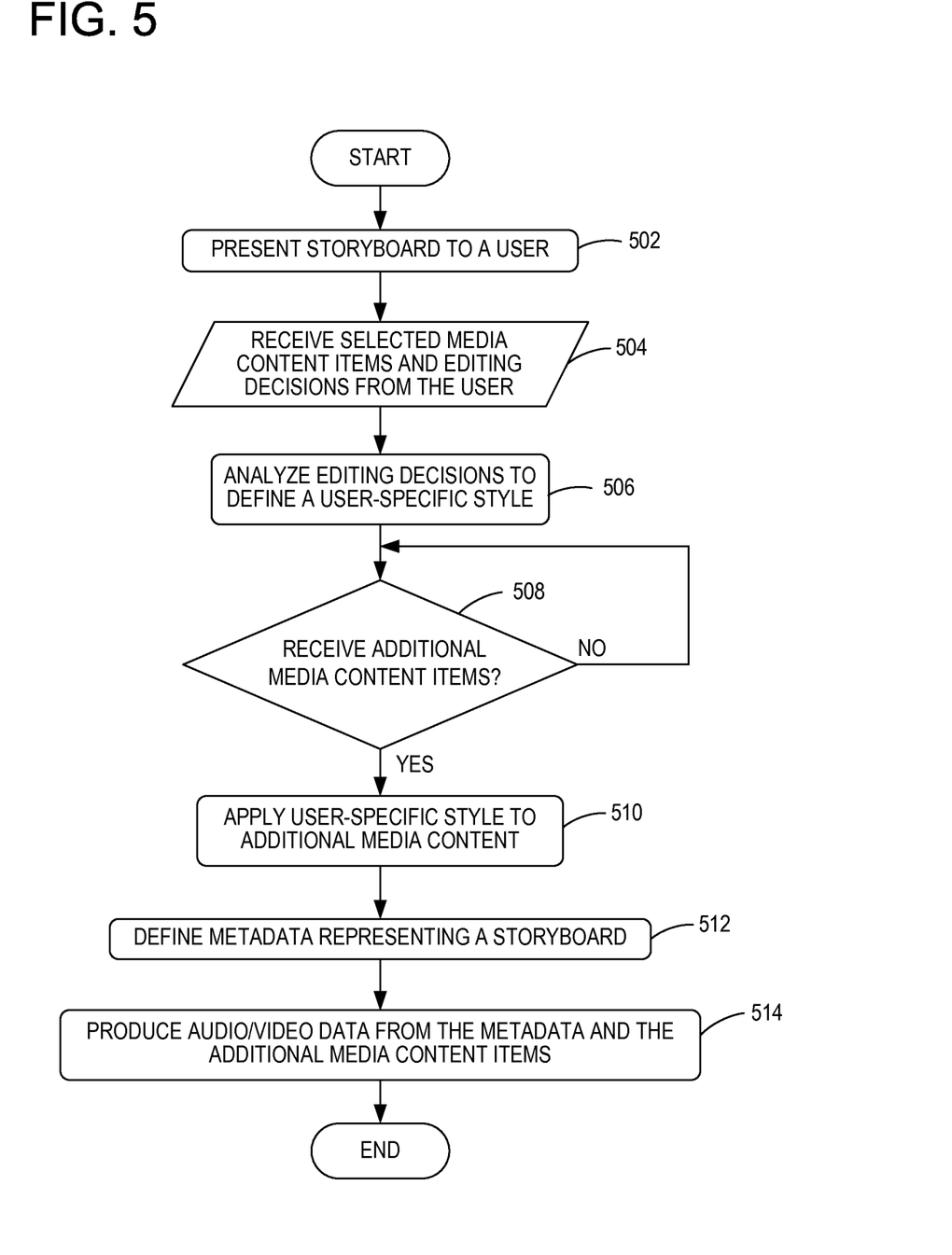
FIG. 5 is an exemplary flow chart illustrating operation of aspects.

Referring next to FIG. 5, a flow chart illustrates exemplary video editing operations. A video editing system embodying aspects presents a first storyboard to a user at 502 (e.g., based on a user selection of a theme or other default storyboard). Selected media content items and editing decisions regarding the selected media content items and the first storyboard are received from the user at 504. For example, the user may drag and drop or cut and paste the selected media content items onto one or more cells in the storyboard template via a user interface. Audio/video data (e.g., a movie) is generated from the first storyboard.

The editing decisions are analyzed at 506 to define a user-specific style. Subsequently, additional media content items may be received at 508. If requested by the user, the user-specific style is applied at 510 to the additional media content items received at 508 to generate a second storyboard. For example, the editing decisions applied to the previously received set of media content items are applied to the additional media content items received subsequently. Metadata representing the second storyboard is defined at 512. The metadata represents properties defining each cell in the storyboard as well as properties defining the overall storyboard. In an embodiment, the defined metadata identifies a sequence of the media content items within each of the cells. The second storyboard is combined with the additional media content items to produce audio/video data.

In this manner, the audio/video data associated with the second storyboard is similar to the audio/video data associated with the first storyboard.

The following examples further illustrate aspects. The tables below list properties and property values for a cell in a storyboard. The properties and property values are derived from an analysis of editing decisions made by users to input video. For example, two users made different decisions when editing a soccer game. Each table includes exemplary characteristics that aspects use to define a user-specific style. The information in the tables below is only an exemplary and non-limiting representation of a portion of the rules and logic used to define the user-specific style.

Table I below lists properties and corresponding property values for a cell in a storyboard representing a highlight video. Table II below lists properties and corresponding property values for a cell in a storyboard representing a full documentary video.

TABLE I

Exemplary Property Values for a Cell in a Highlight Storyboard.

| Highlight | Goal | Goal Attempt | Goal block | Goal | Goal |
|---|---|---|---|---|---|
| Cell | A | B | C | D | E |
| Start transition | Slide | Wipe | Fade | Wipe | Page Curl |
| Duration | 30 | 20 | 45 | 60 | 20 |
| Color | 75 | 85 | 90 | 75 | 65 |
| Motion | 70 | 50 | 85 | 80 | 90 |
| Number of faces | 2 | 4 | 3 | 2 | 3 |
| Mark-in | 20 | 10 | 30 | 40 | 10 |
| Mark-out | 10 | 30 | 20 | 20 | 20 |
| Timecode | :00:10 | 05:05 | 20:00 | 25:00 | 35:00 |
| DSP Audio Matching | 90 | 90 | 95 | 85 | 90 |
| Video effect | None | None | None | None | Slow |

In the example of Table I, the user edits the original media content and chooses only highlight clips that demonstrate key events during the soccer game. Each video clip occurs over a wide range of times throughout the game. The user has edited the video to mostly include close-up shots with just a few people in the scene. In this scenario, aspects detect a limited number of faces, or players on the field. The audio track is also analyzed, and aspects determine patterns that are common among the video clips. In the example of Table I, the patterns include short whistle bursts and crowd noise. The user chooses not to include sections of video without these audio characteristics present. The user also chooses to keep each video clip short by deleting most video clips and trimming out large sections. The user uses more complex transitions to keep the video fast-paced, and to allow the viewer to recognize that time has passed and that a key event is taking place.

TABLE II

Exemplary Property Values for a Cell in a Documentary Storyboard.

| Documentary | | | | | | | | |
|---|---|---|---|---|---|---|---|---|
| Cell | A | B | C | D | E | F | G | H |
| Start transition | Fade | Cut | Wipe | Cut | Cut | Fade | Page | Cut |
| Duration | 4:00 | 6:00 | 3:00 | 7:00 | 5:00 | 6:00 | 3:00 | 4:00 |
| Color | 65 | 75 | 55 | 65 | 45 | 60 | 50 | 65 |
| Motion | 35 | 20 | 70 | 30 | 15 | 25 | 20 | 35 |
| Number of faces | 5 | 6 | 4 | 7 | 4 | 6 | 3 | 3 |
| Mark-in | :10 | 0 | :10 | :20 | :0 | :25 | :20 | 10 |
| Mark-out | :15 | :00 | :15 | :10 | :20 | :10 | :15 | :10 |
| Timecode | 4 | 10 | | | | | | |

In the example of Table II, the user creates a documentary of the soccer game. The intent of the user is to document the entire event rather than just creating a highlights video. Compared to the example corresponding to Table I, the user in this instance includes significantly more media content in the storyboard and makes fewer edits to each of the video clips. As such, the total duration of the resulting movie is much longer, and the overall pace of the movie is slower. Most of the transitions are "fade and cut" which creates more continuity between video clips. The video clips have more wide shots showing more players on the field. The user focuses on a few significant events that include audio signatures, but reserves the use of flashy transitions and special effects.

The figures, description, and examples herein as well as elements not specifically described herein but within the scope of aspects constitute means for defining a user-specific, storyboard style having a plurality of cells each for association with one or more media content items, and means for creating a user-specific, storyboard style based on editing decisions from the user.

Although described in connection with an exemplary computing system environment, embodiments are operational with numerous other general purpose or special purpose computing system environments or configurations. The computing system environment is not intended to suggest any limitation as to the scope of use or functionality of any aspect. Moreover, the computing system environment should not be interpreted as having any dependency or requirement relating to any one or combination of components illustrated in the exemplary operating environment. Examples of well known computing systems, environments, and/or configurations that may be suitable for use with aspects include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, the computing device such as computing device 204 in FIG. 2 executes computer-executable instructions such as those illustrated in the figures to implement aspects. Aspects include the computing device itself when programmed according to the methods and techniques described herein.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects.

When introducing elements of aspects or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects in detail, it will be apparent that modifications and variations are possible without departing from the scope of aspects as defined in the appended claims. As various changes could be made in the above constructions, products, and methods without departing from the scope of the various aspects, it is intended that all matter contained in the above description and shown in the accompanying drawings shall be interpreted as illustrative and not in a limiting sense.

APPENDIX A

Table A1 below lists exemplary cell properties and description of each of the cell properties resulting from application of rules and logic used when analyzing an example storyboard to define a user-specific style.

TABLE A1

Exemplary Cell Properties.

| CELL PROPERTY | DESCRIPTION |
| --- | --- |
| Titles | The label shown on the storyboard or timeline. |
| Ordering | Determines where on the timeline the cell can be positioned. Examples include Start, End, Fixed, Any. If the value start is choose, the cell automatically is positioned at the start of the storyboard template. In an embodiment, the user cannot arrange this item to another location on the storyboard. If more than one storyboard cell has the ordering position of start, the priority property below is then used to determine the position. If both have the same priority, then the cell is ordered based on the start time of the content in the cell. |
| Effects | Specifies the effects that are automatically applied to the media items added to the cell. Each effect may have its own set of customized properties. |
| Start Transitions | Specifies the start transition for the storyboard cell. The cell properties also determine if the user can override the start transition. |
| End Transition | Specifies the end transition for the storyboard cell. If the end transition overlaps an existing start transition, the priority property for the cells determines what final transition is used. The storyboard properties may also determine what transitions are used. The cell properties also determine if the user can override the end transition. |
| Audio effects | Specifies the default auto effects to be added to the cell (e.g., cross-fade between cells). |
| Duration | Specifies the min and max duration of the cell. The cell can determine the min and max duration of each cell. This is especially helpful when photos are added to cells. |

TABLE A1-continued

Exemplary Cell Properties.

| CELL PROPERTY | DESCRIPTION |
| --- | --- |
| Title/caption | Specifies the title or caption to render for the cell. The title may have additional properties that determine how the title is display and how it may be customized by the user. |
| Color | Specifies the amount of color or brightness for video. Video not meeting this requirement maybe removed in an embodiment. |
| Motion | Specifies the amount of motion allowed for video. Video not meeting this requirement maybe removed in an embodiment. |
| Photo Flash | Determine the weight of video clips with detected photoflashes. Photoflashes typically indicate video with key shots and should be included in the finalized video. |
| Custom | Third-party developers may provide additional custom properties that may be applied to each cell. |
| Audio Digital Signal Processing Signatures | |

APPENDIX B

Table B1 below lists exemplary storyboard properties and descriptions of each of the storyboard template properties.

TABLE B1

Exemplary Storyboard Template Properties.

| STORYBOARD TEMPLATE PROPERTY | DESCRIPTION |
| --- | --- |
| Duration | Total duration of the storyboard |
| Included effects | Included set of transitions used on the storyboard |
| Excluded transition | Included transitions used on the storyboard |
| Title | Title used |
| Credits | Credits used |
| Max clip duration | Max clip duration used on the storyboard |
| Min clip duration | Min clip duration used on the storyboard |
| Average Motion vector | Determine the average motion rating for each cell |
| Average Color histogram | Determine the average color histogram for each cell |
| Custom | Third-party developers may provide additional custom properties that can be applied to the storyboard. |

APPENDIX C

The exemplary XML code below represents exemplary metadata for a storyboard.

```
<?xml version="1.0" encoding="utf-8" ?>
<Subshots>
    <Subshot Start="10.0" End="20.0" Entropy="0.665"
    Boundary="0.2271">
        <ColorHistogram>
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
```

-continued

```
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
        </ColorHistogram>
        <Motions>
            <Motion Start="10.0" End="15.0" Pattern="0"
            Intensity="0.0" />
            <Motion Start="15.0" End="20.0" Pattern="2"
            Intensity="0.3" />
        </Motions>
    </Subshot>
    <Subshot Start="20.0" End="32.0" Entropy="0.565"
    Boundary="0.552">
        <ColorHistogram>
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
            0.001 0.002 0.003 0.004 0.005 0.006 0.007 0.008
            0.009 0.010 0.011 0.012 0.013 0.014 0.015 0.016
        </ColorHistogram>
        <Motions>
            <Motion Start="20.0" End="24.0" Pattern="5"
            Intensity="0.5" />
            <Motion Start="24.0" End="30.0" Pattern="0"
            Intensity="0.0" />
            <Motion Start="30.0" End="32.0" Pattern="7"
            Intensity="0.8" />
        </Motions>
    </Subshot>
</Subshots>
```

What is claimed is:

1. A method, implemented at a computer system that includes one or more processors, for automatically editing storyboards based on a learned user-specific editing style, the method comprising:
    determining a first set of characteristics for a first plurality of media content items in a first storyboard, including:
    receiving first user input associating each of the first plurality of media content items with one or more of a first plurality of cells of a first storyboard; and
    analyzing each of the first plurality of media content items, including their associations with the first plurality of cells, to identify the first set of characteristics of the first plurality of media content items;
    determining a set of user-specific editing characteristics applied to the first plurality of media content items in the first story board, including:
    receiving second user input comprising a set of editing decisions, to create an edited first storyboard, the set of editing decisions including a plurality of editing decisions applied to the first plurality of cells to edit the first plurality of media content items in the first storyboard; and
    based on receiving the second user input, automatically defining a user-specific editing style, including comparing the first storyboard to the edited first storyboard to determine one or more user-specific editing style rules corresponding to the set of editing decisions that resulted in the differences between the first storyboard and the edited first storyboard, and defining metadata representing at least one of the plurality of editing decisions applied to the first plurality of cells; and
    automatically applying the user-specific editing style to a second plurality of media content items, including:
    receiving third user input associating each of the second plurality of media content items with one or more of a second plurality of cells of a second storyboard;
    analyzing each of the second plurality of media content items, including, their associations with the second plurality of cells, to identify a second set of characteristics of the second plurality of media content items;
    comparing the first set of characteristics of the first plurality of media content items with the second set of characteristics of the second plurality of media content items, to identify at least one of the second plurality of media content items that has at least one characteristic that matches at least one characteristic of at least one of the first plurality of media content items;
    automatically creating an edited second storyboard, by at least applying the user-specific editing style to the identified at least one of the second plurality of media content items that has at least one characteristic that matches at least one characteristic of at least one of the first plurality of media content items; and
    displaying the edited second storyboard.

2. The method of claim 1, further comprising storing the output data on a computer-readable medium.

3. The method of claim 1, further comprising storing the output data on a display device.

4. The method of claim 1, wherein receiving the first media content items comprises receiving, via a drag and drop model in a user interface, the first media content items into the first plurality of cells in the first storyboard.

5. The method of claim 1, wherein receiving the first media content items comprises receiving, via a cut and paste, model in a user interface, the first media content items into the first plurality of cells in the first storyboard.

6. The method of claim 1, further comprising receiving from the user a user-defined cell property for association with one of the first plurality of cells in the first storyboard.

7. The method of claim 1 wherein said user specific editing style specifies a cell property for each cell and further comprising overriding a defined value for the cell property with a defined value for at least one of the storyboard properties when said, defined value for at least one of the storyboard properties conflicts with said defined value for the cell property.

8. The method of claim 7 wherein, the user specific editing style specifies at least the following cell properties for each cell of the plurality of cells of the first modified storyboard: a start transition effect; an end transition effect; a priority property for determining, when the end transition effect of each cell of the plurality of cells of the first modified storyboard overlaps with a start transition effect of a next cell of the plurality of cells of the first storyboard, which transition is used; and whether the user can override the end transition effect; and when the user is permitted to override the end transition effect, receiving from the user changes to the end transition effect and applying the changes to the end transition effect.

9. The method of claim 1, wherein one or more computer-readable media have computer-executable instructions for performing the method of claim 1.

10. A computer system configured to automatically edit a second plurality of media content items based on a user editing style derived from editing decisions received from a user and applied to a first plurality of media content items, the system comprising:
one or more processors;
a display device; and
one or more storage media having stored thereon computer executable instructions that are executable by the one or more processors to cause the computer system to perform at least the following:
present a first storyboard to the user representing a first timeline;
receive a first plurality of media content items from the user;
associate the first plurality media content items with one or more of a first plurality of cells of the first storyboard;
analyze the first plurality of media content items and associated first plurality of cells to identify one or more first inherent properties;
receive a set of editing decisions regarding the first plurality of media content items associated with the first storyboard;
modify the first plurality of media content items and the first plurality of cells associated with the first storyboard according to the received editing decisions to create a first modified storyboard including a first modified plurality of media content items and a first modified plurality of cells;
compare the first storyboard to the first modified storyboard to determine one or more user-specific editing style rules corresponding to editing, decisions of the user that resulted in the differences between the first plurality of media content items and the first plurality of cells associated with the first storyboard and the first modified plurality of media content items and first modified plurality of cells associated with the first modified storyboard;
receive a second plurality of media content items from the user for association with a second plurality of cells of a second storyboard arranged according to a second timeline;
analyze the second plurality of media content items and associated second plurality of cells to identify one or more second inherent properties;
compare the one or more first inherent properties of the first plurality of media content items to the one or more second inherent properties of the second plurality of media content items to identify one or more of the second plurality of media content items having at least one inherent property in common with one or more of the first plurality of media Content items;
apply the determined user-specific editing style rules to the one or more second plurality of media content items having at least one inherent property in common with one or more of the first plurality of media content items to create a second modified storyboard;
present, at the display device, the second modified storyboard to the user as output data including at least one of audio data and video data.

11. The system of claim 10, wherein the processor is further configured to execute computer-executable instructions for receiving from the user a user-defined storyboard property for association with at least one storyboard style.

12. The system of claim 10, wherein the processor is configured to execute computer-executable instructions for analyzing the second media content based on the cell properties.

13. The system of claim 11, further comprising the processor being configured to execute computer-executable instructions for defining an additional storyboard style based on the received editing decisions.

14. The system of claim 10, wherein the user specific style specifies a cell property for each cell and further comprising overriding a defined value for the cell property with a defined value for at least one of the storyboard properties when the defined value for at least one of the storyboard properties conflicts with the defined value for the cell property.

15. The system of claim 14, further comprising, the determining of a user-specific editing style comprising determining at least the following cell properties for each cell: a start transition effect; an end transition effect; a priority property for determining, when said end transition effect of the each cell overlaps with a start transition effect of a next cell of the first storyboard, which transition effect is used; and whether the user can override said end transition effect; and when the cell properties permit the user to override the end transition effect, receiving from the user changes to the end transition effect and applying the changes to the end transition effect.

16. A computer program product comprising one or more hardware storage devices having stored thereon computer-executable instructions that are executable by one or more processors to automatically edit storyboards based on a learned user-specific editing style, the computer-executable instructions including instructions that are executable to cause the computing device to perform at least the following:
determine a first set of characteristics for a first plurality of media content items in a first storyboard, including:
receiving first user input associating each of the first plurality of media content items with one or more of a first plurality of cells of a first storyboard; and analyzing each of the first plurality of media content items, including their associations with the first plurality of cells, to identify the first set of characteristics of the first plurality of media content items;

determine a set of user-specific editing characteristics applied to the first plurality of media content items in the first story board, including:

receiving second user input comprising a set of editing decisions, to create an edited first storyboard, the set of editing decisions including a plurality of editing decisions applied to the first plurality of cells to edit the first plurality of media content items in the first storyboard; and based on receiving the second user input, automatically defining a user-specific editing style, including comparing the first storyboard to the edited first storyboard to determine one or more user-specific editing style rules corresponding to the set of editing decisions that resulted in the differences between the first storyboard and the edited first storyboard, and defining metadata representing at least one of the plurality of editing decisions applied to the first plurality of cells; and automatically apply the user-specific editing style to a second plurality of media content items, including:

receiving third user input associating each of the second plurality of media content items with one or more of a second plurality of cells of a second storyboard;

analyzing each of the second plurality of media content items, including their associations with the second plurality of cells, to identify a second set of characteristics of the second plurality of media content items;

comparing the first set of characteristics of the first plurality of media content items with the second set of characteristics of the second plurality of media content items, to identify at least one of the second plurality of media content items that has at least one characteristic that matches at least one characteristic of at least one of the first plurality of media content items;

automatically creating an edited second storyboard, by at least applying the user-specific editing style to the identified at least one of the second plurality of media content items that has at least one characteristic that matches at least one characteristic of at least one of the first plurality of media content items; and display the edited second storyboard.

17. The computer program product of claim 16, wherein the user interface module displays, to the user, the output data produced by the rendering module.

18. The computer program product of claim 16, wherein said metadata further defines storyboard properties describing characteristics of the first storyboard, said storyboard properties different from said one or more cell properties, said style module overriding a defined value for a corresponding one of the cell properties with a defined value for at least one of the storyboard properties when said defined value for at least one of the storyboard properties conflicts with said defined value for the corresponding one of the cell properties, said analyzing further comprising analyzing at least one of color histogram information and motion vector information of each cell of the first storyboard by comparing media content items in said each cell before and after the editing decisions have been applied to said each cell to determine rules implementing predefined techniques for analyzing audio and video corresponding to said editing decisions, said metadata including said determined rules, said storyboard properties defined by said metadata including a rendering order for all elements of the nested tree and including nested user-specific styles, each nested user-specific style corresponding to one of the elements of the nested tree.

19. The computer program product of claim 16, wherein the rendering module combines the first storyboard with the first media content items to produce the output data.

20. The computer program product of claim 16, wherein determining the first and second set of characteristics includes determining at least one of a motion characteristic, a color characteristic, a trimming characteristic, a face detection characteristic, a video quality characteristic, an audio characteristic, a shot framing characteristic, or a duration characteristic.

* * * * *